United States Patent
Osnato et al.

(10) Patent No.: US 8,568,213 B2
(45) Date of Patent: Oct. 29, 2013

(54) GAME UNIT WITH CONTROLLER-DETERMINED CHARACTERS

(75) Inventors: Jeffrey Osnato, Cranford, NJ (US); Nicholas Howard, Long Beach, CA (US); Gary Collins, Redondo Beach, CA (US)

(73) Assignee: Mattel, Inc., El Segundo, CA (US)

( * ) Notice: Subject to any disclaimer, the term of this patent is extended or adjusted under 35 U.S.C. 154(b) by 1911 days.

(21) Appl. No.: 11/594,017

(22) Filed: Nov. 6, 2006

(65) Prior Publication Data

US 2007/0149285 A1 Jun. 28, 2007

Related U.S. Application Data

(60) Provisional application No. 60/733,753, filed on Nov. 4, 2005.

(51) Int. Cl.
*A63F 9/24* (2006.01)
(52) U.S. Cl.
USPC .................................. 463/6; 463/36; 463/37
(58) Field of Classification Search
USPC ..................................................... 463/36–39
See application file for complete search history.

(56) References Cited

U.S. PATENT DOCUMENTS

| | | |
|---|---|---|
| 4,588,187 A | 5/1986 | Dell |
| 4,695,953 A | 9/1987 | Blair et al. |
| 4,758,691 A | 7/1988 | De Bruyne |
| 4,846,693 A | 7/1989 | Baer |
| D316,879 S | 5/1991 | Shulman et al. |
| RE33,662 E | 8/1991 | Blair et al. |
| D328,315 S | 7/1992 | Shulman |
| 5,174,759 A | 12/1992 | Preston et al. |
| 5,178,545 A | 1/1993 | Thompson |
| 5,186,460 A | 2/1993 | Fongeallaz et al. |
| 5,239,464 A | 8/1993 | Blair et al. |
| 5,245,320 A | 9/1993 | Bouton |
| 5,311,207 A | 5/1994 | Kusumoto et al. |
| 5,317,336 A | 5/1994 | Hall |
| 5,370,536 A | 12/1994 | Chuang |
| 5,389,950 A | 2/1995 | Bouton |
| 5,396,267 A | 3/1995 | Bouton |
| 5,421,590 A * | 6/1995 | Robbins ......................... 463/37 |
| 5,453,758 A | 9/1995 | Sato |

(Continued)

OTHER PUBLICATIONS

EA Sports NBA Live 2003 Manual http://www.replacementdocs.com/download.php?view.1147 Game release date: Oct. 7, 2002. Manual last accessed Jun. 4, 2011.*

*Primary Examiner* — Tramar Harper
(74) *Attorney, Agent, or Firm* — Kolisch Hartwell, PC

(57) ABSTRACT

An electronic game apparatus. The apparatus may include at least a first player input device and a second player input device. Each player input device may have a plurality of buttons adapted to be manipulated by a player, thereby producing player input signals for moving one or more characters within the game environment. The apparatus may also include a base unit coupled to the player input devices. The base unit may include a game processor adapted to receive the plurality of player input signals and to determine therefrom a game simulation. The game processor may transmit output signals representative of the game simulation to a monitor device. Optionally the game simulation may include movements of at least one of the first player and the second player character based upon input signals from the corresponding player input device. Each player character may be selectable from different groups of player characters.

22 Claims, 5 Drawing Sheets

(56) References Cited

U.S. PATENT DOCUMENTS

| | | | |
|---|---|---|---|
| 5,511,983 A | 4/1996 | Kashii et al. | |
| D375,326 S | 11/1996 | Yokoi et al. | |
| 5,593,350 A | 1/1997 | Bouton et al. | |
| 5,594,215 A | 1/1997 | Jeng | |
| D379,203 S | 5/1997 | Oikawa | |
| D380,503 S | 7/1997 | Tyler | |
| 5,668,574 A | 9/1997 | Jarlance-Huang | |
| 5,670,992 A | 9/1997 | Yasuhara et al. | |
| 5,692,956 A * | 12/1997 | Rifkin | 463/37 |
| 5,749,577 A | 5/1998 | Couch et al. | |
| D395,464 S | 6/1998 | Shiibashi et al. | |
| 5,766,077 A * | 6/1998 | Hongo | 463/30 |
| 5,820,462 A | 10/1998 | Yokoi et al. | |
| 5,823,876 A | 10/1998 | Unbehand | |
| 5,829,745 A | 11/1998 | Houle | |
| D410,970 S | 6/1999 | Larian | |
| 5,919,092 A | 7/1999 | Yokoi et al. | |
| 5,963,199 A | 10/1999 | Kato et al. | |
| 5,967,898 A | 10/1999 | Takasaka et al. | |
| 5,976,018 A | 11/1999 | Druckman | |
| D420,708 S | 2/2000 | Holmes et al. | |
| 6,033,309 A | 3/2000 | Couch et al. | |
| 6,050,897 A | 4/2000 | Suzuki et al. | |
| 6,068,554 A | 5/2000 | Tyler | |
| D435,603 S | 12/2000 | Holmes et al. | |
| 6,159,099 A | 12/2000 | Chen | |
| 6,191,777 B1 | 2/2001 | Yasuhara et al. | |
| 6,200,219 B1 | 3/2001 | Rudell et al. | |
| 6,201,947 B1 | 3/2001 | Hur et al. | |
| D441,028 S | 4/2001 | Jung | |
| 6,364,771 B1 | 4/2002 | Lee | |
| 6,461,238 B1 | 10/2002 | Rehkemper et al. | |
| 6,475,083 B1 * | 11/2002 | Gomez et al. | 463/1 |
| 6,544,124 B2 | 4/2003 | Ireland et al. | |
| 6,597,342 B1 | 7/2003 | Haruta | |
| 6,607,437 B2 | 8/2003 | Casey et al. | |
| 6,623,358 B2 | 9/2003 | Harima | |
| 6,645,070 B2 | 11/2003 | Lupo | |
| 6,672,962 B1 | 1/2004 | Ozaki et al. | |
| 6,692,333 B2 | 2/2004 | Kislevitz et al. | |
| 6,714,189 B2 | 3/2004 | Collins | |
| 6,805,631 B2 | 10/2004 | Izumi | |
| 6,809,722 B2 | 10/2004 | Mei et al. | |
| 6,878,062 B2 | 4/2005 | Bjorklund et al. | |
| 6,929,543 B1 | 8/2005 | Ueshima et al. | |
| 2001/0018359 A1 | 8/2001 | Izumi | |
| 2001/0029201 A1 * | 10/2001 | Minami | 463/31 |
| 2002/0142838 A1 | 10/2002 | Russell | |
| 2003/0022717 A1 | 1/2003 | Bjorklund et al. | |
| 2003/0036417 A1 | 2/2003 | Ueshima | |
| 2004/0259638 A1 | 12/2004 | Kramer et al. | |
| 2005/0107145 A1 | 5/2005 | Karashima et al. | |
| 2005/0148389 A1 | 7/2005 | Ma et al. | |
| 2005/0197187 A1 * | 9/2005 | Mitsuyoshi et al. | 463/31 |
| 2005/0230230 A1 | 10/2005 | Ueshima et al. | |
| 2005/0245316 A1 * | 11/2005 | Tanaka et al. | 463/37 |

\* cited by examiner

Fig. 4

| CONTROLLER | AVAILABLE VEHICLE CHARACTERS |
|---|---|
| BASE UNIT A | STREET/TRACK VEHICLE A, STREET/TRACK VEHICLE B |
| PLAYER INPUT DEVICE A | STREET/TRACK VEHICLE C, STREET/TRACK VEHICLE D |
| BASE UNIT B | OFF-ROAD VEHICLE A, OFF-ROAD VEHICLE B |
| PLAYER INPUT DEVICE B | OFF-ROAD VEHICLE C, OFF-ROAD VEHICLE D |

| SITUATION | DIRECTION SIGNALS ⟋140 ⟋168 | SPEED SIGNALS ⟋112 ⟋148 ⟋172 | VEHICLE MOVEMENT ⟋200 |
|---|---|---|---|
| NO VEHICLE BEHIND | LEFT | ANY | DECELERATE VEHICLE WITHIN LANE |
| VEHICLE BEHIND | LEFT | ANY | BATTLE WITH VEHICLE BEHIND |
| NO VEHICLE AHEAD | RIGHT | ANY | ACCELERATE VEHICLE WITHIN LANE |
| VEHICLE AHEAD | RIGHT | ANY | BATTLE WITH VEHICLE AHEAD |
| NO VEHICLE ABOVE | UP | ANY | CHANGE TO LANE ABOVE |
| VEHICLE ABOVE | UP | ANY | BATTLE WITH VEHICLE IN LANE ABOVE |
| NO VEHICLE BELOW | DOWN | ANY | CHANGE TO LANE BELOW |
| VEHICLE BELOW | DOWN | ANY | BATTLE WITH VEHICLE IN LANE BELOW |
| ANY | ANY | HOLE | BATTLE WITH VEHICLE IN LANE BELOW |
| ANY | ANY | RELEASE | ACCELERATE AND KEEP PACE WITH OTHER VEHICLES |
| VEHICLE ON GROUND | ANY | DOUBLE-TAP | |
| VEHICLE COMING OFF RAMP | NONE | DOUBLE-TAP | EXECUTE LEVEL-ONE TRICK |
| VEHICLE COMING OFF RAMP | NONE | TRIPLE-TAP | EXECUTE LEVEL-TWO TRICK |
| VEHICLE COMING OFF RAMP | NONE | QUADRUPLE-TAP | EXECUTE "SPECIAL" MANEUVER TRICK |

GAME UNIT WITH CONTROLLER-DETERMINED CHARACTERS

RELATED APPLICATIONS

The present application claims the benefit of U.S. Provisional Patent Application Ser. No. 60/733,753, filed on Nov. 4, 2005, the complete disclosure of which is hereby incorporated by reference herein in its entirety and for all purposes.

TECHNICAL FIELD

The present disclosure relates to electronic game apparatus, and more particularly to electronic game apparatus that are connected to an audio-video monitor such as a television set, in which one or more participants interact with one or more controllers to effect movements, within a game environment, of one or more characters that are selectable from a group of characters corresponding to each input controller, and to the methods of gameplay with these apparatus.

BACKGROUND OF THE DISCLOSURE

An electronic game apparatus may include one or more controller units that may be manipulated by one or more participants in order to simulate a game simulation such as an automobile race. Examples of electronic game assemblies using electronic inputs, input devices for video games or other computing devices, and/or mechanical racing games are found in U.S. Pat. Nos. 4,588,187; 4,695,953; 4,758,691; 4,846,693; 5,174,759; 5,178,545; 5,186,460; 5,239,464; 5,245,320; 5,311,207; 5,317,336; 5,370,536; 5,389,950; 5,396,267; 5,421,590; 5,453,758; 5,511,983; 5,593,350; 5,594,215; 5,668,574; 5,670,992; 5,692,956; 5,749,577; 5,820,462; 5,823,876; 5,829,745; 5,919,092; 5,963,199; 5,967,898; 5,976,018; 6,033,309; 6,050,897; 6,068,554; 6,159,099; 6,191,777; 6,200,219; 6,201,947; 6,364,771; 6,461,238; 6,544,124; 6,597,342; 6,607,437; 6,623,358; 6,645,070; 6,672,962; 6,692,333; 6,714,189; 6,805,631; 6,809,722; 6,878,062; and 6,929,543, in U.S. Reissue Pat. No. RE33662, in U.S. Design Pat. Nos. D316879; D328315; D375326; D379203; D380503; D395464; D410970; D420708; D435603; and D441028, and in U.S. Patent Application Publication Nos. 2001/0018359; 2002/0142838; 2003/0022717; 2003/0036417; 2004/0259638; 2005/0107145; 2005/0148389; 2005/0230230. The entire disclosures of each of the patents, patent applications, and patent application publications recited in this and in other paragraphs are all incorporated by reference herein in their entirety and for all purposes.

SUMMARY OF THE DISCLOSURE

An electronic game apparatus may include at least a first player input device and a second player input device. Each player input device may have a plurality of buttons adapted to be manipulated by a player, thereby producing player input signals for moving one or more characters within the game environment. The apparatus may also include a base unit coupled to the player input devices. The base unit may include a game processor adapted to receive the plurality of player input signals and to determine therefrom a game simulation. The game processor may transmit output signals representative of the game simulation to a monitor device. Optionally the game simulation may include movements of at least one of the first player and the second player character based upon input signals from the corresponding player input device. Each player character may be selectable from different groups of player characters.

BRIEF DESCRIPTION OF THE DRAWINGS

FIG. 4 is a table including an exemplary list of available vehicles corresponding to controllers of the electronic game apparatus of FIG. 1.

FIG. 5 is a table including exemplary game simulation responses for combinations of control signals of the electronic game apparatus of FIG. 1.

DETAILED DESCRIPTION OF THE DISCLOSURE

Electronic game apparatus that simulate racing may be operated by one or more participants or users. These electronic game apparatus may include one or more controller units that are each adapted to be manipulated by a participant or player to provide control signals that are transmitted to a game processor to determine a game simulation that includes movements of one or more characters within a game environment. The game processor and/or an audio-video processor may be adapted to transmit output signals representative of the game simulation to a monitor device, such as a television set.

Figure 1:
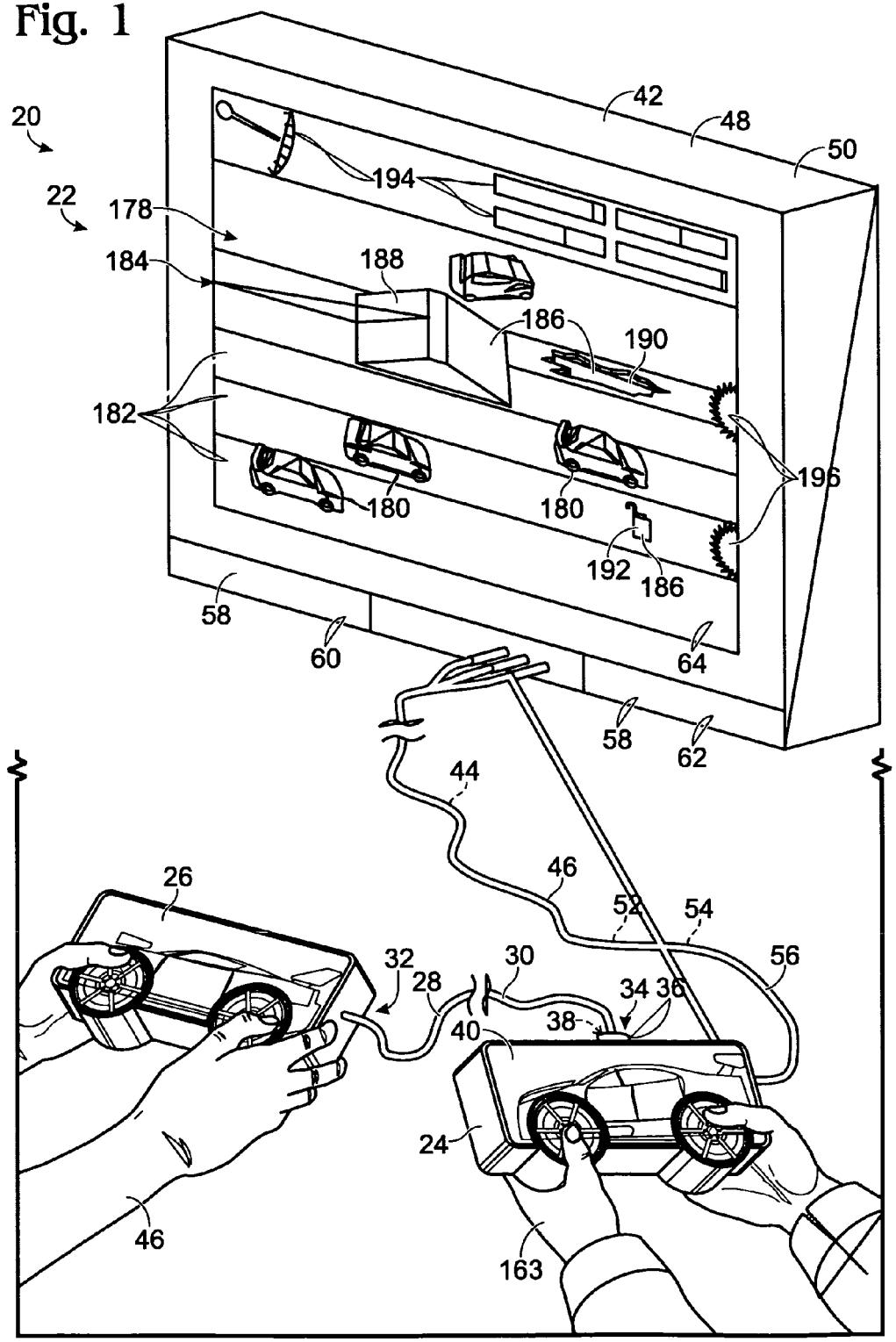
FIG. 1 is a perspective view of an exemplary electronic game apparatus according to the present disclosure.

Turning now to the drawings, a schematic representation of an exemplary electronic game apparatus is shown in FIG. 1, and is indicated generally at 20. FIG. 1 shows an electronic racing game apparatus 22 as an example of electronic game apparatus 20 that may provide a simulation of an automobile race between one or more participant-operated characters and one or more computer-operated characters. Other embodiments may simulate other activities such as horse racing, dog racing, and the like. Electronic racing game apparatus 22 may include a base unit 24 and at least one player input device 26. Base unit 24 may be operatively connected to the at least one player input device 26 via an inter-unit linkage 28 that may include an electrical connection 30.

Electrical connection 30 may extend from a first end 32 to a second end 34. In the example shown in FIG. 1, first end 32 is fixedly coupled to player input device 26. Also in the example shown, second end 34 includes a connector 36 that may be adapted to removably couple with a port 38 disposed on a housing 40 of base unit 24. Connector 36 and port 38 may be adapted to couple using any suitable connection, such as mating multiple-pin connectors. In other examples, the electrical connection may be fixedly coupled to both the base unit and the at least one player input device, or removably coupled with both. In still other examples, inter-unit linkage 28 may include a wireless connection.

Base unit 24 may also be operatively and electrically connected to a monitor device 42 to transport output signals 44 by way of a monitor linkage 46. Monitor device 42 may include an audio-video monitor device 48. In the present example, the monitor device includes a television set 50, or a suitable alternative. Accordingly, output signals 44 may include an audio signal 52 and a video signal 54 that may be transmitted to the monitor device via a suitable wired or wireless communications link, such as a multi-conductor cable 56.

For example, conventional RCA or phono cabling may operatively couple base unit 24 to monitor device 42. Audio signal 52 may have one or more channels or tracks to produce, for example, either monophonic or stereophonic sound. Similarly, video signal 54 may be formatted using conventional composite video encoding, conventional RGB encoding, or S-Video encoding. Multi-conductor cable 56 may therefore include any appropriate number of conductors, according to the format of the output signals. In other embodiments, output signals 44 may be transmitted to television set 50, or a suitable alternative, via a coaxial cable that is operatively connected to the antenna jack of the television set, or via any other connections known in the art.

Television set 50 may include an audio unit 58 having a left audio source 60 and a right audio source 62, and a video unit 64, which may include a cathode ray tube (CRT) display, an LCD display, or suitable alternative. Audio unit 58 and video unit 64 may be adapted to render audio signals 52 and video signals 54, respectively, as audible sound and visual images representative of output signals 44.

Figure 2:
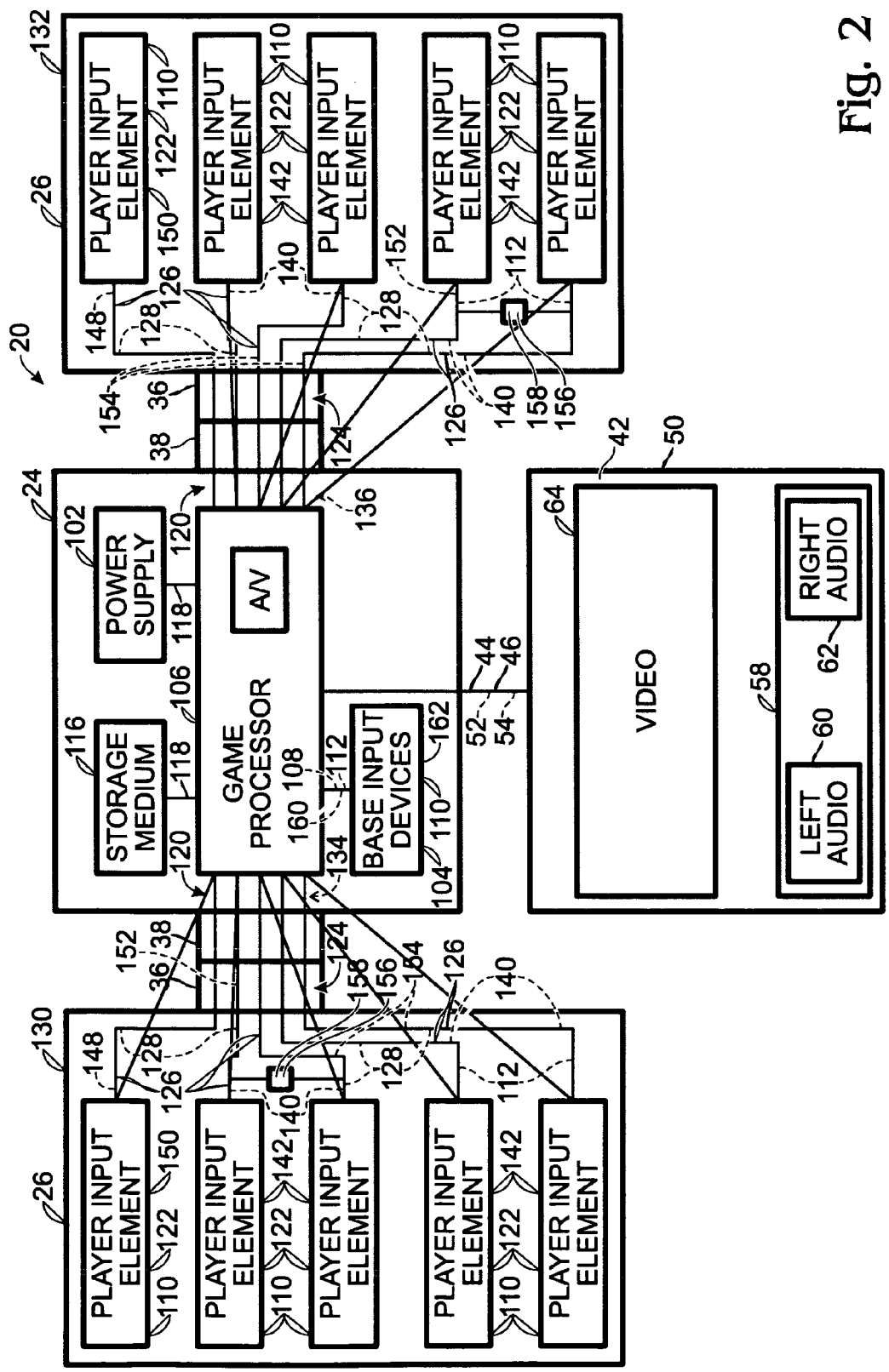
FIG. 2 is a schematic of an electronic game apparatus according to the present disclosure.

As particularly shown in FIG. 2, base unit 24 may include a power supply 102, at least one base input device 104, and a game processor 106. Power supply 102 may include one or more batteries, an AC/DC converter, and the like. Base input devices 104 may include any combination of joysticks, trackballs, level switches, contact switches, and so forth, that are each adapted to produce a corresponding base input signal 108. Base input devices 104 and base input signals 108 may each be included with a plurality of input devices 110 and a plurality of input signals 112, respectively.

Game processor 106 may include one or more analog or digital circuits, logic units, or processors for operating programs stored as software in memory, and may include one or more distinct units in communication with each other. The game processor may be adapted to receive a plurality of input signals 112 from a plurality of input devices 110, and to determine the game simulation therefrom. For example, the game processor may be adapted to receive base input signals 108 from the at least one base input device 104.

The game processor may include an audio-video processor 114 adapted to determine output signals 44 representative of the game simulation and to transmit the output signals to monitor device 42 along monitor linkage 46. Output signals 44 may include audio signals 52 and/or video signals 54 that may be rendered into sound and/or a visual display by monitor device 42, for example by television set 50. In some examples, the audio-video processor may be included with a separate processor that is operatively coupled to game processor 106.

Optionally, base unit 24 may include a computer readable medium 116 such as memory components to store game parameters. Computer readable medium 116 may each be either non-removable or removable in order to transfer parameters to other electronic game apparatus 20, and may each be a read-only medium or a read-write medium. Additionally or alternatively, the computer readable media may include one or more sequences of instructions that, when executed by one or more processors such as game processor 106, electronic game apparatus 20 may play alternatively themed games.

Base unit 24 may further include a plurality of linkages 118 that may include a combination of cables, wires, and/or wireless connections that are adapted to transmit input signals 108, power, and/or other signals from other components of electronic game apparatus 20 to game processor 106. Optionally, base unit 24 may include a plurality of base connections 120.

Player input devices 26 may include a plurality of player input elements 122 operatively coupled to a plurality of player connections 124 by a plurality of conductors 126. Each player input element may be adapted to transmit a player input signal 128. The same number of player input elements 122, conductors 126, player connections 124, and base connections 120 may be used. In the present example, each plurality may include five members. Accordingly, each player input signal may be transmitted from one of the plurality of player input elements 122 to one of the plurality of conductors 126 to one of the plurality of player connections 124 to one of the plurality of base connections 120. Throughout this description, it is to be assumed that if an electronic signal is transmitted to and/or received by a selected component that is electrically connected to one or more other components, then the signal may be transmitted to and/or received by any of the other components to which the selected component is electrically connected.

Electronic game apparatus 20 includes at least a first player input device 130 and a second player input device 132. First player input device 130 and second player input device 132 may be adapted to produce and/or transmit first player input signals 134 and second player input signals 136, respectively. In some examples, base unit 24 may include a plurality of ports 38 that each may be adapted to be removably coupled to one of the player input devices. In other examples, the base unit may be removably coupled to a selected one of the player input devices. Optionally, the base unit may be fixedly coupled to one or more of the player input devices.

Figure 3:
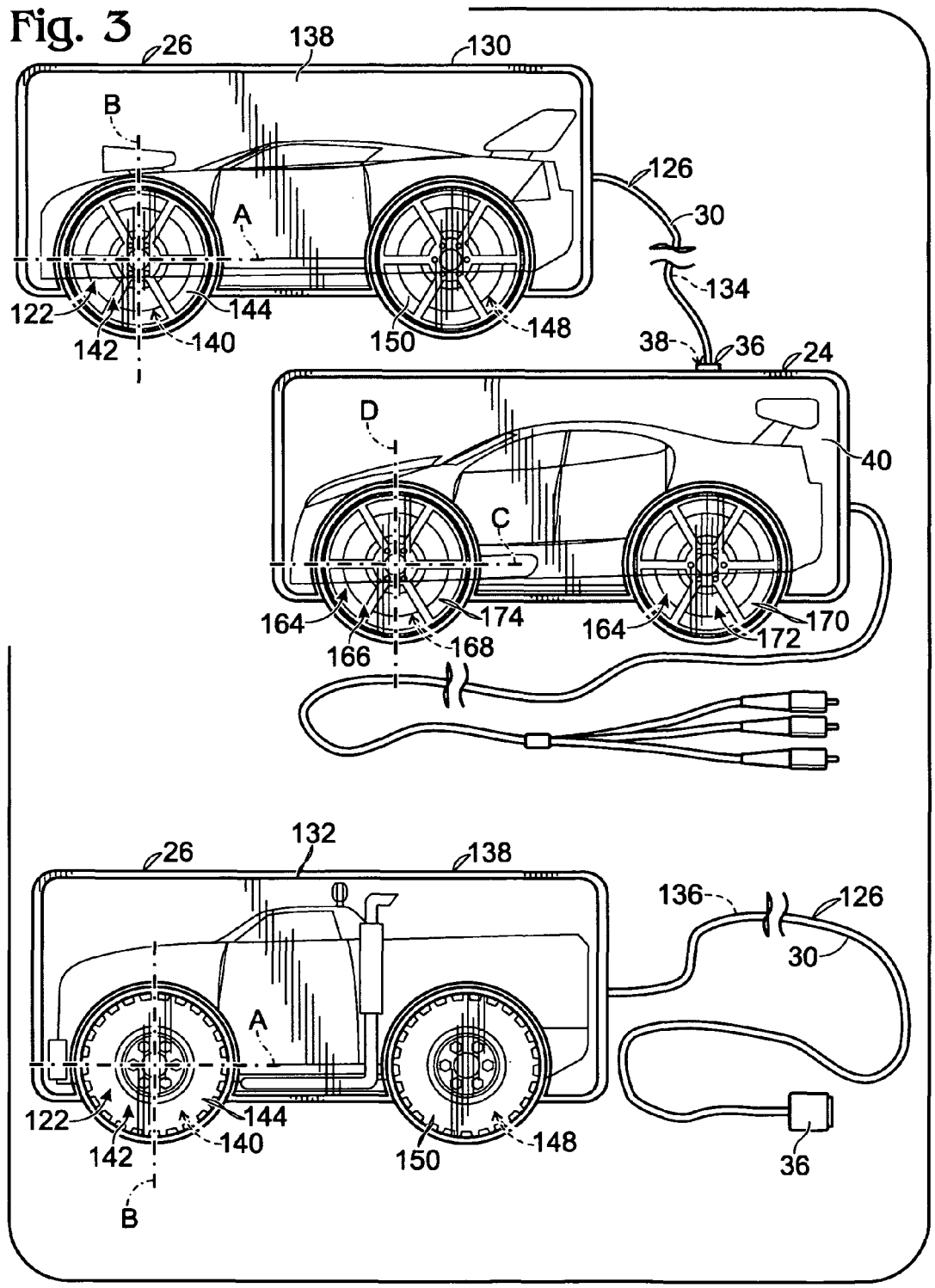
FIG. 3 is a plan view of several elements of the electronic game apparatus of FIG. 1.

Referring specifically to FIG. 3, connector 36 of first player input device 130 is shown coupled to port 38 of base unit 24, whereas connector 36 of second player input device 132 is shown separated from the port. Accordingly, first player input device 130 may be considered the selected player input device of electronic racing game apparatus 22, as configured in FIG. 3. A player may disconnect first player input device 130 and connect second player input device 132 in its place. In this proposed configuration, the second player input device may now be considered the selected player input device. In other examples, base unit 24 may include a plurality of ports 38 that are each adapted to be removably coupled to a selected one of a group of one or more player input devices. Optionally, each port may be removably couplable to a selected one of a different group, with some or no overlap between members of each group.

Also shown specifically in FIGS. 1 and 3, each player input device 26 includes conductors 126 that extend externally from a housing 138 of the player input device. The plurality of conductors 126 may collectively form electrical connection 30. In this example, the conductors may terminate in at connector 36 that is removably couplable to port 38.

In other examples, conductors 126 may be internal to player input device 26, with connector 36 disposed on housing 138. The electronic game apparatus may optionally include a cable that is fixedly coupled to the base unit at one end, and that has port 38 at an opposite end. Optionally, the cable may be removably coupled to the base unit. Some embodiments may include a plurality of ports that each may be adapted to be removably couplable to all or some of the plurality of player input devices.

Optionally, each player input device 26 may include a power supply and/or one or more processors that are operatively coupled to the player input elements and are adapted to perform some or all of the functions described in reference to game processor 106. In these examples, the one or more processors may transmit signals to and/or receive signals from the game processor.

Electronic racing game apparatus 22 may include play modes that allow any number of players to compete as one or more player-operated characters, or that allow play of a single player to compete as a player-operated character against any number and variety of computer-operated characters. In response to player input signals 128 created by manipulation of player input elements 122 by one or more players holding one or more player input devices, game processor 106 may determine a game simulation that includes movements of at least a first player character and/or a second player character.

The movements of the first player character may be based upon first player input signals 134 from first player input device 130. The first player character may be selectable from a first group of player characters that correspond to the first player input device. Similarly, the movements of the second player character may be based upon second player input signals from second player input device 132. The second player character may be selectable from a second group of player characters that correspond to the second player input device. In some examples, the first group of player characters may be different from the second group of player characters. FIG. 4 shows a table 202 including an exemplary list of available vehicles corresponding to exemplary base units 24 and player input devices 26. Optionally, at least one player character may be included in both the first group and the second group.

Player input signals 128 may include a plurality of direction signals 140 that each correspond to one of a plurality of directions. Player input elements 122, as has been discussed, may be adapted to transmit the player input signals. Accordingly, the player input devices may each include one or more direction elements 142 that are adapted to transmit direction signals. In the present example, four directions may be used, corresponding to four of the player input elements, to four of the direction signals, to four of the player connections, and to four of the base connections.

One or more directions may be substantially opposite a different one of the plurality of directions. In an example in which four directions are used, the four directions may correspond to "up," "down," "left," and "right." The "up" direction may be substantially opposite the "down" direction. Similarly, the "left" direction may be substantially opposite the "right" direction.

Direction elements 142 may each include one or more buttons, switches, sliders, dials, and the like, that are disposed on housing 138. Optionally, direction elements 142 may collectively form a direction button 144 that is adapted to pivot, relative to the player input device or housing 138, along two axes A and B, thereby producing two pairs of direction signals corresponding to substantially opposite directions. In some examples, axis A may correspond to the substantially opposite directions of up and down, and axis B may correspond to the substantially opposite directions of left and right. Accordingly, one or more players 146 of electronic racing game apparatus 22 may grasp first player input device 130 and/or second player input device 132 and manipulate direction button 144.

Optionally, player input signals 128 may further include one or more speed input signals 148. Accordingly, player input elements 122 may include one or more speed elements 150 that are adapted to transmit speed signals 148. Speed elements 150 may each include one or more buttons, switches, sliders, dials, and the like that are disposed on housing 138 proximal to direction elements 142, for example direction button 144.

Game processor 106, upon receiving various combinations of player input signals 128 including at least one direction signal 140 and/or at least one speed signal 148, may determine the game simulation including various movements of the player character, corresponding to the received combination of player input signals, as will be discussed in greater detail hereinbelow.

The game simulation of electronic racing game apparatus 22 may include movements of only one of the first player character and the second player character. As has been discussed, base unit 24 may be adapted to be removably coupled to a selected one of first player input device 130 and second player input device 132. Game processor 106 may receive an identification signal 152 transmitted from the selected one of the player input devices. For example, first player input device 130 may be adapted to transmit the identification signal on a first player connection 124a, and second player input device may be adapted to transmit the identification signal on a second player connection 124b.

The player input devices may be adapted to transmit the identification signal in response to receiving a polling signal 154. When electronic game apparatus 20, for example electronic racing game apparatus 22, is powered on or when one or more components of base unit 24 detects that one or more player input device has been coupled, game processor 106 may transmit the polling signal to one or more base connections 120. In some examples, player input devices 26 may include one or more circuit elements 156, for example diode 158, that may convert polling signal along one player connection to the identification signal along a different player connection.

It may be useful to transmit the identification signal along a specific one of the plurality of player connections 124 if the polling signal were received along one of the plurality of player connections corresponding to a direction that substantially opposite the direction corresponding to the direction signal transmitted along the first player connection. Accordingly, first player input device 130 may transmit the identification signal along first player connection 124a in response to receiving the polling signal along a third player connection 124c. Similarly, second player input device 132 may transmit the identification signal along second player connection 124b in response to receiving the polling signal along a fourth player connection 124d. Correspondingly, game processor 106 may transmit the polling signal along third base connection 120c and/or fourth base connection 120d.

Optionally, the game processor may be adapted to determine the game simulation further including movements of an opponent character within the game environment. The opponent character may be selectable from a group of opponent input characters. The movements of the opponent character may be based upon a plurality of opponent input signals 160 that may be transmitted by an opponent input device 162. Opponent input signals 160 may be included with input signals 112 that are transmitted to game processor 106.

In some examples, base unit 24 may be adapted to be held by an opponent 163 and manipulated in order to produce the opponent input signals. Accordingly, the opponent input device may be one or more of base input devices 104. Similarly, the opponent input signals may be one or more of base input signals 108.

Opponent input device 162 may include a plurality of opponent input elements 164. The opponent input elements may include one or more opponent direction elements 166 that are each adapted to transmit opponent direction signals 168, and/or one or more opponent speed elements 170 that are each adapted to transmit opponent speed signals 172. Opponent direction elements 166 and/or opponent speed elements 170 may each include one or more buttons, switches, sliders, dials, and the like that are disposed on housing 40.

Optionally, opponent direction elements 166 may collectively form an opponent direction button 174 that is adapted to pivot, relative to the base unit or housing 40, along two axes C and D, thereby producing at least one direction signal corresponding to each of the two axes. In some examples, axis C may correspond to the substantially opposite directions of up and down, and axis D may correspond to the substantially opposite directions of left and right. Accordingly, opponent 163 of electronic racing game apparatus 22 may grasp base unit 24 and manipulate opponent direction button 174 and opponent speed element 170.

Game processor 106, upon receiving various combinations of opponent input signals 160 including at least one opponent direction signal 168 and/or at least one opponent speed signal 172, may determine game the game simulation including various movements of the opponent character, corresponding to the received combination of player input signals, as will be discussed in greater detail hereinbelow.

As has been discussed, game processor 106 may determine the game simulation and may transmit output signals 44, including video signals 54, that are representative of the game simulation. FIG. 1 shows television set 50 with a visual depiction 178 that may be a rendering of the video signals. Visual depiction 178 may include one or more vehicles 180 that may be racing within one or more lanes 182 on a race environment 184. The race environment may also include one or more interactive features 186. Some interactive features 186, such as ramp 188 and oil spill 190, may present challenges and/or advantages to the participants. Other exemplary interactive features may include shields, blasters, saws, boosters, potholes, animals, etc.

Other interactive features, such as bonus features 192 may provide one or more characters with bonus points, may benefit the one or more character to a health, speed, or other performance variable, and/or may enable the one or more character to perform "power" maneuvers, which will be described below. Accordingly, visual depiction 178 may include one or more performance indicators 194 that indicate values or icons representative of health, speed, or other performance variables and/or earned "power" maneuvers. Optionally, the visual depiction may include one or more markers 196 that appear at an end of a lane in which an interactive feature 186 may be present.

During gameplay, characters 198, for example one or more computer-operated characters, one or more player characters, and/or one or more opponent characters, may engage in game activities responsive to one or more input signals that may be generated by the one or more players and/or the opponent. For example, during gameplay with electronic racing game apparatus 22, characters 198 may include one or more vehicles 164 that engage in racing activities: Accordingly, base unit 24 and player input devices 26 may each depict vehicles. Direction button 144 and speed element 150 may form one or more wheels of the vehicles depicted by player input devices 26. Similarly, opponent direction button 174 and opponent speed element 170 may form wheels of the vehicle depicted by base unit 24.

Game processor 106 may provide each participant with the ability to select one character from a group or groups of characters that will be responsive to input signals from the participant. Optionally, the members of each group of characters that may be available to each participant may be reflective of the type of vehicle depicted by the base unit or the player input device each participant uses to generate the input signals. For example, base unit 24 and first player input device 130 shown in FIG. 3 both depict vehicles that may be driven on solid surfaces such as streets or paved racetracks. Accordingly, the groups of vehicle available to the holders of base unit 24 and first player input device 130 may include vehicles that may be driven on solid surfaces such as streets or paved racetracks. Similarly, second player input device 132 shown in FIGS. 1 and 3 depicts a vehicle that may be driven on off-road surfaces such as mud, snow, dirt, sand, and the like. Accordingly, the group of vehicles available to the holder of the second player input device may include off-road type vehicles.

Optionally, race environment 184 may be selectable by the participants of the electronic game apparatus. For example, one or more street racecourses, racetrack courses, and/or combinations of these racecourses may be available to be selected, corresponding to base unit 24 shown in FIGS. 1 and 3. Optionally, one or more off-road race environments may be available to be selected. Game processor 106 may provide a setup mode that may allow the participants to select the character or characters in play, including all participant-operated characters and all computer-operated characters, and/or the active race environment. The participants may navigate the setup mode with input devices 110 such as base input devices 104 and/or player input elements 122. In some examples, game processor 106 may select one or more characters in play and/or the active race environment. The selection of characters and/or race environments may follow a predetermined pattern, may follow a random pattern, and/or may be in response to performance of one more characters in a previously completed game or game phase.

FIG. 5 shows a table 200 that includes non-exclusive relationships between combinations of input signals 112 including direction signals 140, speed signals 148, opponent direction signals 168, and opponent speed signals 172. As indicated in table 200, speed signals 148 and/or opponent speed signals 172 may include signals that are produced from one, two, three, four, or more rapid depressions or "taps" of the input device.

For example vehicles 164 corresponding to each character may move forward or backward within lanes 182, or from one lane to an adjacent lane. Movements of a vehicle corresponding to each participant-operated character may be in response to combinations of player input signals 128 from the player input device 26 or base unit 24 of each participant, and may correspond to a group of maneuvers available to each character or group of characters. Each character or vehicle may be capable of performing a core group of maneuvers that may include lane changes, acceleration, deceleration, tricks, and/or battling. Optionally, each character or group of characters may be capable of performing one or more "special" maneuvers that may include lane changes, acceleration, deceleration, battling, and/or tricks. Prior to performing one or more "special" maneuver, each character may be required to achieve measures of game performance such as accrued points, vehicles passed, successful tricks performed, bonus features captured, etc.

As has been suggested, vehicles 180 may move forward or backward within lanes 182, and/or may move from one lane to an adjacent lane. Similarly, visual depiction 178 may, in general, scroll from right to left. Optionally, a speed at which the visual depiction scrolls may correspond to a speed at one or more vehicles may be traveling in the game simulation, and may be indicated on one or more performance indicators 194. Accordingly, the visual depiction may correspond to a racing game simulation in which the vehicles transverse an elongated race environment, with only a segment visible at a time.

The visible segment changes as the characters, such as vehicles 180, advance through the race environment.

Game simulations that include movements of a participant-operated character from one lane to an adjacent lane may be generated by manipulating input devices 110 on either base unit 24 or player input device 26 to generate input signals 112 corresponding to the "up" direction and/or the "down" direction. In some examples, characters may move freely between adjacent lanes if the location in the adjacent lane is not occupied by another vehicle. If the adjacent lane is occupied by another vehicle, then a battling maneuver may be performed, as will be described below.

Game simulations that include acceleration or deceleration of a participant-operated character, corresponding to advancing forward or backward within one lane 182, may be generated by manipulating input devices 110 on either base unit 24 or player input device 26 to generate input signals 112 corresponding to the "right" direction and the "left" direction, respectively. In some examples, characters may move freely forward or backward if the forward or backward location in the lane is not occupied by another vehicle. If the forward or backward location in the lane is occupied by another vehicle, then a battling maneuver may be performed, as will be described below. Game simulations that include acceleration or deceleration may also be generated by manipulating input devices 110 on either base unit 24 or player input device 26 to generate input signals 112 corresponding to speed signal 148 and/or opponent speed signal 172.

Adjacent vehicles may perform battling maneuvers to determine if one of the adjacent vehicles may "take over" a position from the other. For example, a participant may generate multiple repeating direction signals corresponding to the direction of the adjacent vehicle. Optionally, the participant corresponding to the adjacent vehicle may generate countering input signals. The timing and/or the frequency of the direction signals for each of the battling vehicles may determine a "winner" of the battle. As a result of the battling maneuvers, one or more of the vehicles involved may take on battle damage and/or may lose control. Participant-operated vehicles that lose control may lose the game.

Game simulations that include tricks may be generated by manipulating input devices 110 on either base unit 24 or player input device 26 to generate input signals 112 corresponding to speed signal 148 and/or opponent speed signal 172 as the vehicle traverses ramp 188. Optionally, game simulations corresponding to different trick maneuvers such as back flips and corkscrews may be generated as a result of different values of the speed signals. In some examples, one or more trick maneuvers may be included in the "special" maneuvers discussed previously. Trick maneuvers may be executed successfully or unsuccessfully. Successful execution of a trick maneuver may enhance one or more performance variables, whereas unsuccessful execution of a trick maneuver degrade one or more performance variables, or may cause the vehicle to lose control and the player to lose the game.

Game simulations that include "power" maneuvers may be generated by manipulating input devices 110 on either base unit 24 or player input device 26 to generate input signals 112 corresponding to speed signal 148 and/or opponent speed signal 172 in game simulations other than those described previously. A non-exclusive example of one "power" maneuvers may include placing one or more oil spills 190 or other features that may be difficult for one or more groups of vehicles to pass. Other examples may provide the participant-operated vehicle more advanced capabilities during battling.

Each available race environment 184 may include different groups of interactive features 188, particularly interactive features that impede progress of one or more groups of vehicles. One or more of these interactive features, as suggested previously, may result from previous actions of one or more characters or vehicles. Accordingly, each group of vehicle may experience difficulties, which may degrade one or more performance variables, while maneuvering within one or more race environments. Additionally or alternatively, each group of vehicle may be better able to perform specific maneuvers, which may enhance one or more performance variables, within one or more race environments. For example, one or more street vehicles may struggle to gain traction within race environments having sandy or rough terrain, but are able to travel in control at great speeds within street race environments.

Electronic game apparatus 20, for example electronic racing game apparatus 22, may provide a plurality of play modes for one or two participants, such as player 146 and opponent 163. In the present example, electronic racing game apparatus 22 may include a "street circuit" mode in which the participant holds base unit 24 and manipulates opponent direction button 174 and opponent speed element 170. Optionally, the participant may hold the selected one of first player input device 130 and second player input device 132 and may manipulate direction button 144 and speed element 150.

In the "street circuit" one-participant mode, the game simulation may progress through a sequence of race situations that present varying challenges. Optionally, the sequence may progress from less challenging race situations to more challenging race situations. The participant may select from one or more available sequences. Each race situation in the selected may include a selected race environment in which the participant may guide the vehicle to perform one or more tasks.

For example, tasks may include "qualify," "race," "stunt," and "elimination." In a "qualify" task, the participant may guide the vehicle through the selected race environment in which no computer-operated vehicles are present. In a "race" task, the participant may guide the vehicle in a race against a team of computer-operated vehicles. To complete the "race" task successfully, the participant may attempt to beat each of the computer-operated vehicles to the finish line of the selected race environment, which may optionally include defeating or destroying one or more computer-operated vehicles in battles.

In a "stunt" task, the participant may guide the vehicle through the selected race environment with the goal of successfully completing a plurality of complex "trick" maneuvers. In an "elimination" task, the participant may guide the vehicle through the selected race environment against a team of computer-operated vehicles with the goal of defeating or destroying each of the computer-operated vehicles in battles. In either "race" or "elimination" tasks, the team of computer-operated vehicles may include any suitable number of members, which may be selectable by the participant, or may be selected by the game processor.

Similarly, electronic racing game apparatus 22 may provide one or more play modes for either one or two participants. For example, in a "quick race" mode, the one or two participants may each guide a selected vehicle through one race environment selected at random from the library of race environments to compete against a randomly selected team of computer-operated vehicles. In a "custom race' mode, the one or two participants may each guide a selected vehicle to complete a task from the "street circuit" mode against a selected team of computer-operated vehicles through a selected race environment.

This disclosure may include one or more independent or interdependent inventions directed to various combinations of features, functions, elements and/or properties. While examples of apparatus and methods are particularly shown and described, many variations may be made therein. Various combinations and sub-combinations of features, functions, elements and/or properties may be claimed in one or more related applications. Such variations, whether they are directed to different combinations or directed to the same combinations, whether different, broader, narrower or equal in scope, are regarded as included within the subject matter of the present disclosure.

The described examples are illustrative and directed to specific examples of apparatus and/or methods rather than a specific invention, and no single feature or element, or combination thereof, is essential to all possible combinations. Thus, any one of various inventions that may be claimed based on the disclosed example or examples does not necessarily encompass all or any particular features, characteristics or combinations, unless subsequently specifically claimed. Where "a" or "a first" element or the equivalent thereof is recited, such usage includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically indicated.

INDUSTRIAL APPLICABILITY

The methods and apparatus described in the present disclosure are applicable to toys, games, and other devices, and industries in which amusement devices are used.

We claim:

1. An electronic game apparatus for providing a game simulation on a monitor device, the game simulation including movements of one or more characters within a game environment, the game apparatus comprising:
a plurality of player input devices including at least a first type of player input device and a second type of player input device, each type of player input device having a plurality of buttons that are configured to be manipulated by hands of a player, thereby producing a plurality of player input signals for moving at least one of the one or more characters within the game environment; and
a base unit coupled to the player input devices and including a game processor configured to receive the plurality of player input signals and to determine therefrom the game simulation, the game processor being further configured to transmit output signals representative of the game simulation to the monitor device, the one or more characters in the game simulation including at least one of a first player character and a second player character, the game simulation including at least one of
movements of the first player character based upon first player input signals from the first type of player input device, the first player character being selectable from a first group of player characters corresponding to only the first type of player input device, and
movements of the second player character based upon second player input signals from the second type of player input device, the second player character being selectable from a second group of player characters corresponding to only the second type of player input device, the second group of player characters being different from the first group of player characters.

2. The electronic game apparatus of claim 1, wherein the base unit is configured to be held by an opponent and further includes a opponent input device configured to produce a plurality of opponent input signals, wherein the game processor is configured to receive the plurality of opponent input signals, to determine therefrom the game simulation that further includes movements of an opponent character within the game environment that are based upon the opponent input signals.

3. The electronic game apparatus of claim 2, wherein the opponent input device includes a plurality of buttons that are configured to be manipulated by hands of the opponent, thereby producing the plurality of opponent input signals.

4. The electronic game apparatus of claim 1, wherein the plurality of buttons includes a direction button that is configured to pivot, relative to the player input device, along two axes, thereby producing at least one direction signal representing each of the two axes.

5. The electronic game apparatus of claim 1,
wherein each type of player input device is configured to transmit an identification signal,
wherein each type of player input device includes at least a first player connection and a second player connection;
wherein the base unit is configured to be removably coupled to a selected one of the first type of player input device and the second type of player input device, the base unit including a first base connection and a second base connection that are configured to electrically couple to the first player connection and the second player connection, respectively, of the selected one of the first type of player input device and the second type of player input device;
wherein the first type of player input device is configured to transmit the identification signal on the first player connection,
wherein the second type of player input device is configured to transmit the identification signal on the second player connection, and
wherein the game simulation includes movements of only one of the first player character and the second player character,
the game simulation including the movements of the first player character when the identification signal is transmitted on the first player connection, and
the game simulation including the movements of the second player character when the identification signal is transmitted on the second player connection.

6. The electronic game apparatus of claim 5,
wherein each type of player input device includes a first player input element, a second player input element, a first conductor, and a second conductor;
wherein the first player input element is operatively coupled to the first player connection via the first conductor;
wherein the second player input element is operatively coupled to the second player connection via the second conductor; and
wherein the base unit has a housing upon which the first base connection and the second base connection are disposed.

7. The electronic game apparatus of claim 5,
wherein each type of player input device further includes at least a third player connection and a fourth player connection;
wherein the base unit further includes at least a third base connection and a fourth base connection that are configured to couple to the third player connection and the fourth player connection, respectively, of the selected one of the first type of player input device and the second type of player input device;
wherein the game processor is configured to transmit a polling signal along the third base connection and along the fourth base connection,
wherein the first type of player input device is configured to transmit the identification signal along the first player connection in response to receiving the polling signal, and
wherein the second type of player input device is configured to transmit the identification signal along the second player connection in response to receiving the polling signal.

8. The electronic game apparatus of claim 7,
wherein the plurality of player input signals includes a plurality of direction signals that each correspond to one of a plurality of directions, including:
a first direction signal corresponding to a first direction,
a second direction signal corresponding to a second direction,
a third direction signal corresponding to a third direction that is substantially opposite the first direction, and
a fourth direction signal corresponding to a fourth direction that is substantially opposite the second direction; and
wherein the first player connection is configured to transmit the first direction signal;
wherein the second player connection is configured to transmit the second direction signal;
wherein the third player connection is configured to transmit the third direction signal; and
wherein the fourth player connection is configured to transmit the fourth direction signal.

9. The electronic game apparatus of claim 7, wherein the first type of player input device includes a diode configured to convert the polling signal on the third player connection into the identification signal on the first player connection, and wherein the second type of player input device includes a diode configured to convert the polling signal on the fourth player connection into the identification signal on the second player connection.

10. The electronic game apparatus of claim 1, wherein:
the first type of player input device and the second type of player input device each depict vehicles; and
the members of each group of player characters each represent vehicles that are reflective of the type of vehicle depicted by a corresponding one of the first type of player input device or the second type of player input device.

11. A method of playing an electronic game, comprising:
transmitting a plurality of first player input signals from a first type of player input device;
receiving the plurality of first player input signals at a base unit;
transmitting a plurality of second player input signals from a second type of player input device;
receiving the plurality of second player input signals at the base unit;
determining a game simulation that includes movements of at least one of a first player character and a second player character within a game environment,
the first player character being selectable from a first group of player characters corresponding to only the first type of player input device, the movements of the first player character based upon the plurality of first player input signals, and
the second player character being selectable from a second group of player characters corresponding to only the second type of player input device, the second group of player characters being different from the first group of player characters, the movements of the second player character based upon the plurality of second player input signals;
transmitting output signals representative of the game simulation to a monitor device; and
displaying the game simulation on the monitor device.

12. The method of claim 11, wherein the base unit is removably coupled to the first type of player input device and the second type of player input device.

13. The method of claim 12, wherein the base unit is removably coupled to a selected one of the first type of player input device and the second type of player input device.

14. An electronic game apparatus for providing a game simulation on a monitor device, the game simulation including movements of a player character within a game environment, the game apparatus comprising:
a plurality of player input devices including at least a first type of player input device and a second type of player input device, each type of player input device being configured to be manipulated by a player, each type of player input device transmitting a plurality of input signals that include an identification signal and a plurality of player input signals for moving the player character within the game environment, each type of player input device including at least a first player connection and a second player connection, each player connection configured to transmit one of the plurality of player input signals; and
a base unit configured to be removably coupled to a selected one of the first type of player input device and the second type of player input device, the base unit including a first base connection and a second base connection that are configured to electrically couple to the first player connection and the second player connection, respectively, of the selected one of the first type of player input device and the second type of player input device, the base unit further including a game processor configured to receive the plurality of input signals and to determine therefrom the game simulation, the game processor being further configured to transmit output signals representative of the game simulation to the monitor device, wherein the first type of player input device is configured to transmit the identification signal on the first player connection,
wherein the second type of player input device is configured to transmit the identification signal on the second player connection,
wherein the game simulation includes movements of a first player character when the identification signal is transmitted on the first player connection, the game processor being configured to receive the identification signal transmitted on the first player connection and provide a player of the first type of player input device with a first group of player characters, the first group of player characters being associated with only the identification signal transmitted on the first player connection prior to the first type of player input device transmitting any of the plurality of input signals, the first player character being selectable from the first group of player characters corresponding to a depiction associated with the first type of player input device, and wherein the game simulation includes movements of a second player character when the identification signal is transmitted on the second player connection, the game processor being configured to receive the identification signal transmitted on the second player connection and provide a player of the second type of player input device with a second group of player characters, the second group of player characters being associated with only the identification signal transmitted on the second player connection prior to the second type of player input device transmitting any of the plurality of input signals, the second player character being selectable from the second group of player characters corresponding to a depiction associated with the second type of player input device, the second group of player characters being different from the first group of player characters.

15. The electronic game apparatus of claim 14, wherein each type of player input device includes a first player input element, a second player input element, a first conductor, and a second conductor;

wherein the first player input element is operatively coupled to the first player connection via the first conductor;

wherein the second player input element is operatively coupled to the second player connection via the second conductor; and wherein the base unit has a housing upon which the first base connection and the second base connection are disposed.

16. The electronic game apparatus of claim 14, wherein each type of player input device further include at least a third player connection and a fourth player connection;

wherein the base unit further includes at least a third base connection and a fourth base connection that are configured to couple to the third player connection and the fourth player connection, respectively, of the selected one of the first type of player input device and the second type of player input device;

wherein the game processor is configured to transmit a polling signal along the third base connection and along the fourth base connection, wherein the first type of player input device is configured to transmit the identification signal along the first player connection in response to receiving the polling signal, and wherein the second type of player input device is configured to transmit the identification signal along the second player connection in response to receiving the polling signal.

17. The electronic game apparatus of claim 16, wherein the plurality of player input signals includes a plurality of direction signals that each correspond to one of a plurality of directions, including:
a first direction signal corresponding to a first direction,
a second direction signal corresponding to a second direction,
a third direction signal corresponding to a third direction that is substantially opposite to the first direction, and
a fourth direction signal corresponding to a fourth direction that is substantially opposite to the second direction; and wherein the first player connection is configured to transmit the first direction signal;

wherein the second player connection is configured to transmit the second direction signal;

wherein the third player connection is configured to transmit the third direction signal; and wherein the fourth player connection is configured to transmit the fourth direction signal.

18. The electronic game apparatus of claim 16, wherein the first type of player input device includes a diode configured to convert the polling signal on the third player connection into the identification signal on the first player connection, and wherein the second type of player input device includes a diode configured to convert the polling signal on the fourth player connection into the identification signal on the second player connection.

19. The electronic game apparatus of claim 14, wherein the base unit further includes an opponent input device configured to be manipulated by an opponent thereby transmitting a plurality of opponent signals, wherein the game simulation further includes the movements of an opponent character within the game environment based on the plurality of opponent input signals.

20. A method, comprising:

transmitting an identification signal from a selected one of a plurality of player input devices, the player input devices including a first type of player input device and a second type of player input device, each type of player input device including at least a first player connection and a second player connection, each player connection being configured to transmit one of a plurality of player input signals for moving a player character within a game environment, the first player connection of the first type of player input device being also configured to transmit the identification signal and the second player connection of the second type of player input device being also configured to transmit the identification signal;

transmitting the plurality of player input signals;

receiving the identification signal and the plurality of player input signals at a base unit that includes a first base connection and a second base connection that are removably connected to the first player connection and the second player connection, respectively, of a selected one of the first type of player input device and the second type of player input device, determining a game simulation based upon the received plurality of player input signals and the received identification signal;

wherein the game simulation includes movements of a first player character when the identification signal is transmitted on the connected first player connection, the first player character being selectable from a first group of player characters corresponding to only the identification signal transmitted on the connected first player connection, the first group of player characters being associated with only the identification signal transmitted on the connected first player connection prior to the (i) transmitting an identification signal from a selected one of a plurality of player input devices and (ii) transmitting the plurality of player input signals, and wherein the game simulation includes movements of a second player character when the identification signal is transmitted on the connected second player connection, the second player character being selectable from a second group of player characters corresponding to only the identification signal transmitted on the connected second player connection, the second group of player characters being associated with only the identification signal transmitted on the connected second player connection prior to the (i) transmitting an identification signal from a selected one of a plurality of player input devices and (ii) transmitting the plurality of player input signals, the second group of player characters including at least one character different from any character of the first group of player characters, and the first group of player characters including at least one character different from any character of the second group of player characters;

transmitting output signals representative of the game simulation to a monitor device; and displaying the game simulation on the monitor device.

21. The method of claim 20, wherein each type of player input device further includes at least a third player connection and a fourth player connection;

wherein the base unit further includes at least a third base connection and a fourth base connection that are removably connected to the third player connection and the fourth player connection, respectively, of the selected one of the first type of player input device and the second type of player input device, the third base connection and the fourth base connection each configured to transmit a polling signal to a corresponding player connections, wherein the first type of player input device is configured to convert the polling signal on the third player connection into the identification signal on the first player connection, wherein the second type of player input device is configured to convert the polling signal on the fourth player connection into the identification signal on the second player connection, wherein the method further comprises transmitting the polling signal from the base unit, and wherein transmitting an identification signal includes transmitting the identification signal in response to receiving the polling signal.

22. The method of claim 21, wherein transmitting the plurality of player input signals includes:

transmitting a first direction signal on the first player connection, the first direction signal corresponding to a first direction, transmitting a second direction signal on the second player connection, the second direction signal corresponding to a second direction, transmitting a third direction signal on the third player connection, the third direction signal corresponding to a third direction that is substantially opposite to the first direction, and transmitting a fourth direction signal on the fourth player connection, the fourth direction signal corresponding to a fourth direction that is substantially opposite to the second direction.

\* \* \* \* \*